Sept. 29, 1953
E. MARTIN ET AL
2,653,671
PITCH LOCK
Filed Nov. 23, 1949
4 Sheets-Sheet 1
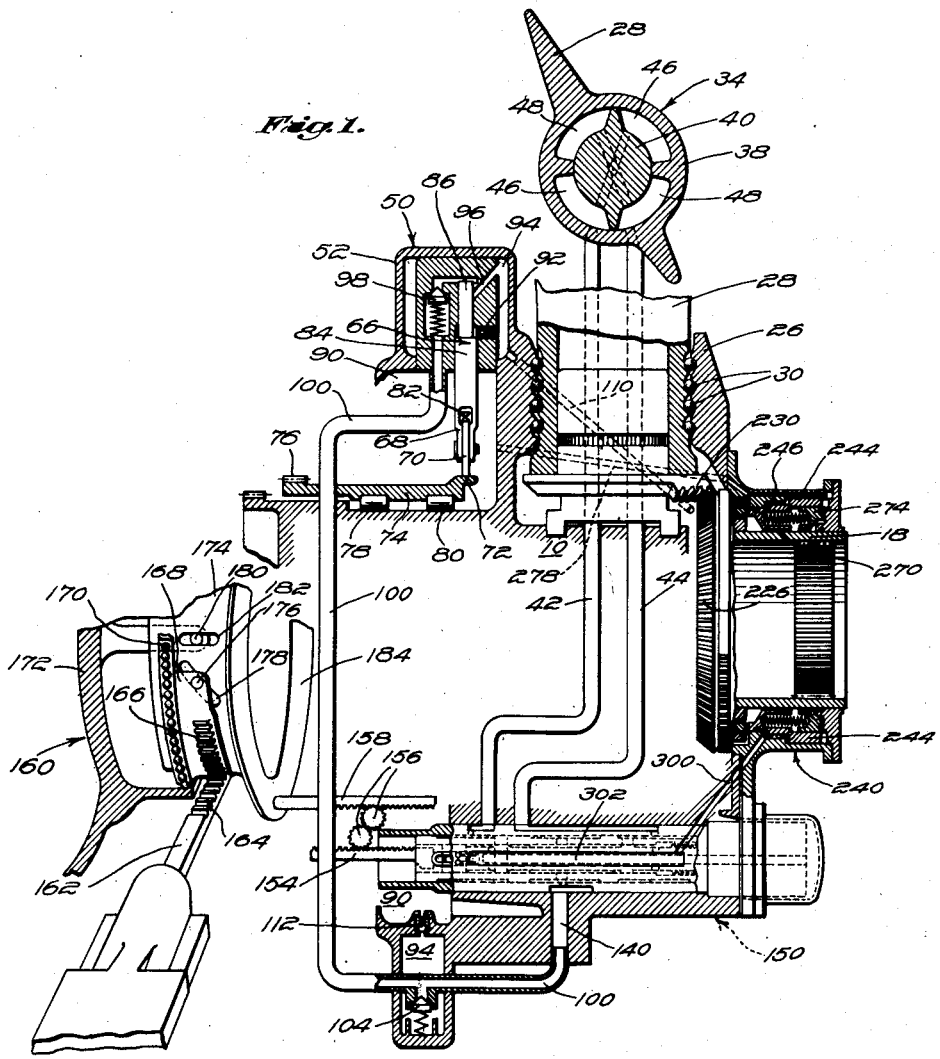
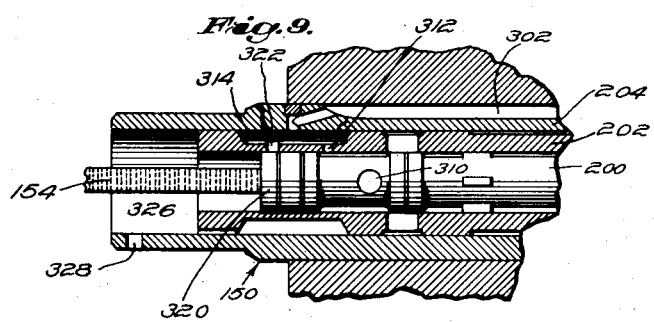
Inventors
Erie Martin
Thomas B. Raines
by Harris G. Luther
Attorney

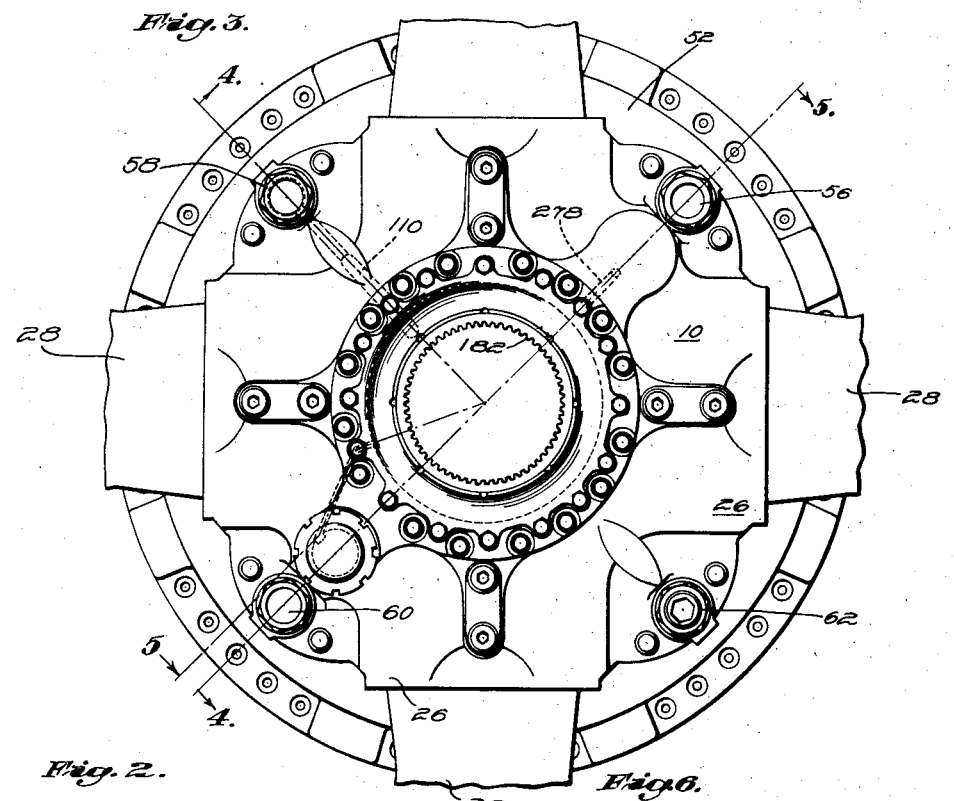
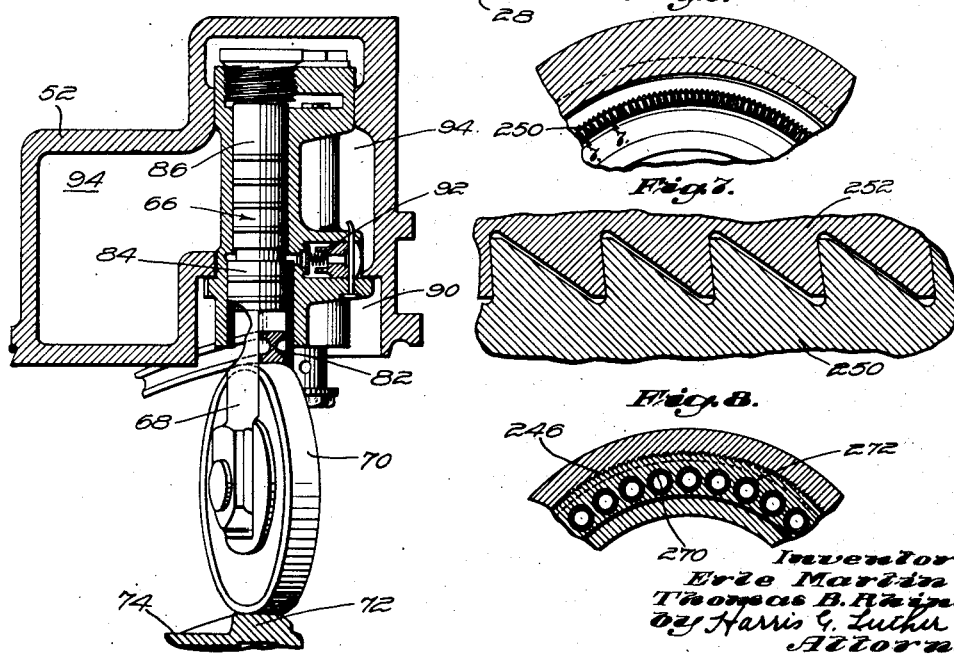

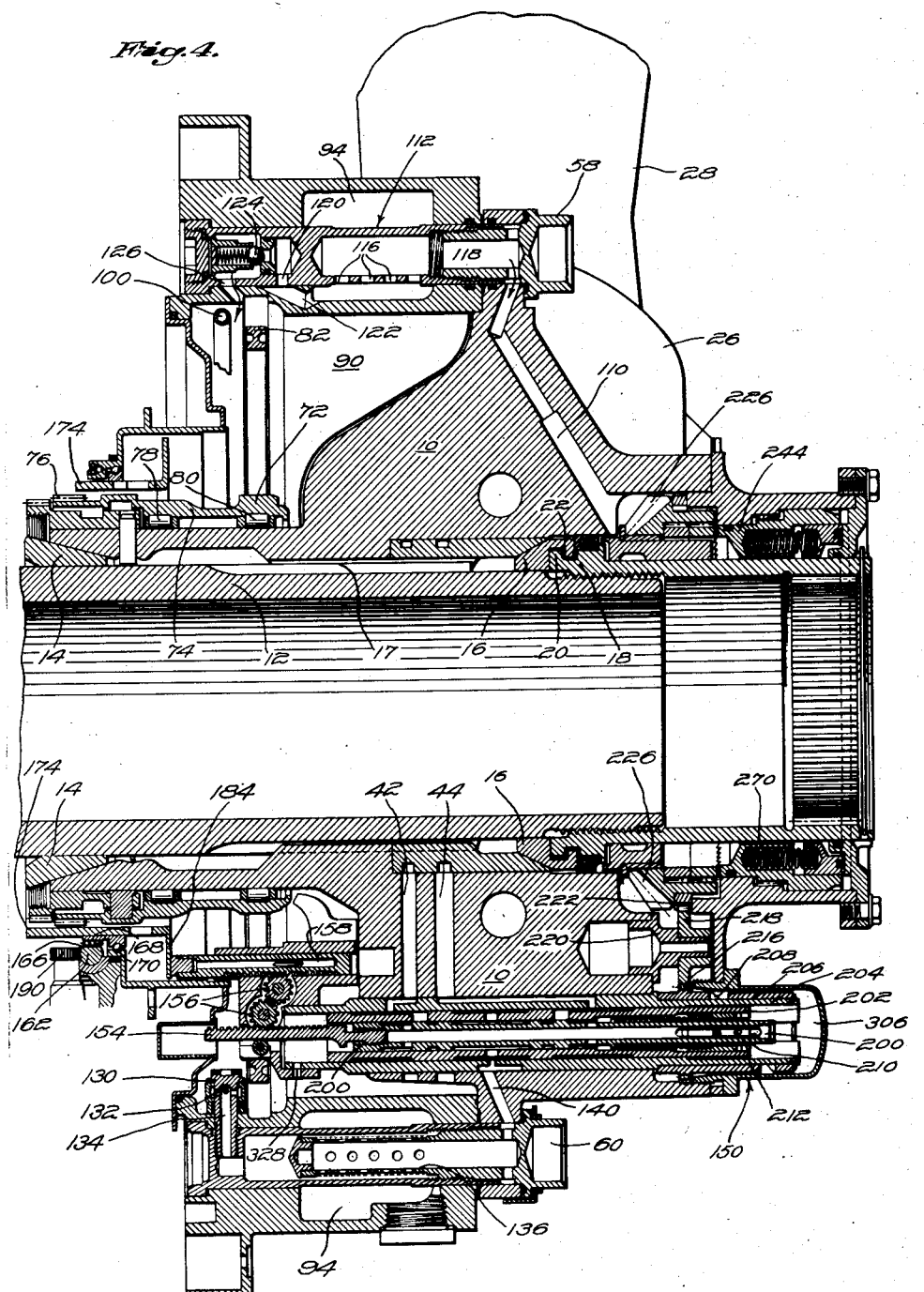

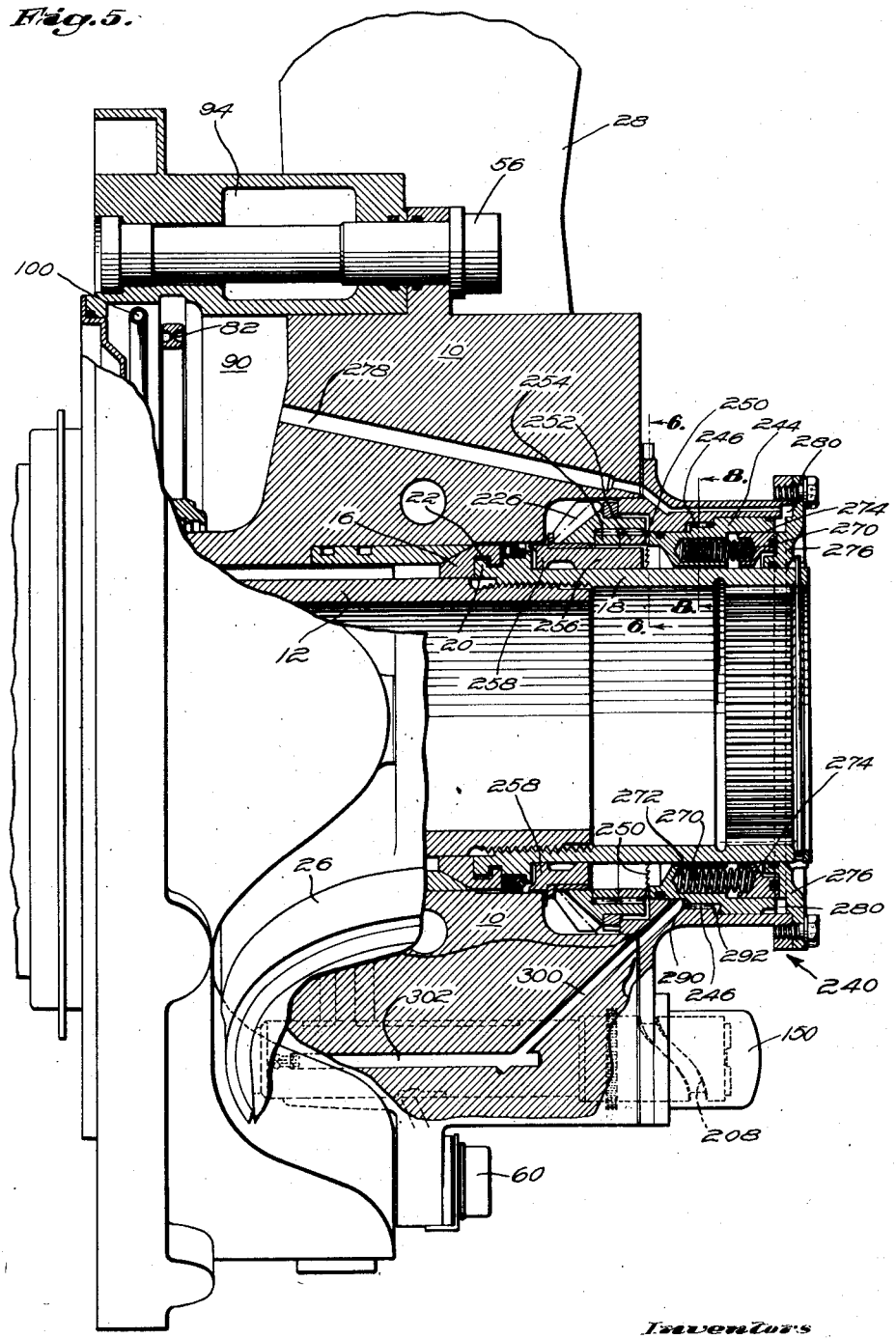

Patented Sept. 29, 1953

2,653,671

UNITED STATES PATENT OFFICE 2,653,671

PITCH LOCK

Erle Martin, West Hartford, and Thomas B. Rhines, Glastonbury, Conn., assignors to United Aircraft Corporation, East Hartford, Conn., a corporation of Delaware Application November 23, 1949, Serial No. 129,082

6 Claims. (Cl. 170—160.33)

This invention relates to propellers and more specifically to a blade locking means for variable pitch aircraft propellers. A pitch lock mechanism having some characteristics similar to this invention is described in copending patent application Serial No. 128,955, filed November 23, 1949, by John E. Anderson, now Patent No. 2,635,702.

It is an object of this invention to provide a blade locking means for fluid operated variable pitch propellers wherein the blades are locked against pitch changing movements upon failure of the blades to properly respond to controlling movements of the associated propeller control mechanism, i. e., when the blades completely fail to change pitch or when the rate of pitch change falls below a predetermined value relative to the rate of movement of the pitch control.

It is another object of this invention to provide a blade lock in combination with a pitch control mechanism wherein the blades are locked against pitch change upon a predetermined positioning of the control mechanism relative to the pitch position of the blades.

It is a further object of this invention to provide a blade locking mechanism of the type described which locks the blades against pitch changing movements in only one direction.

These and other objects will become readily apparent from the following detailed description of the accompanying drawings in which, Fig. 1 is a schematic view in partial perspective illustrating the major components of the propeller and blade pitch lock units according to this invention.

Fig. 2 is a detailed cross sectional view in partial perspective indicating an individual hydraulic pump unit for the propeller.

Fig. 3 is a front view of a portion of the propeller assembly of this invention including the hub and broken away portions of the blades.

Fig. 4 is a cross sectional view of a propeller hub taken along the line 4—4 of Fig. 3.

Fig. 5 is a partial sectional view taken substantially along the line 5—5 of Fig. 3 with portions of this view broken away to more clearly illustrate the hydraulic fluid passages to the lock mechanism.

Fig. 6 is a partial cross sectional view taken along the line 6—6 of Fig. 5.

Fig. 7 is a detailed sectional view taken along the line 7—7 of Fig. 6.

Fig. 8 is a partial cross sectional view taken along the line 8—8 of Fig. 5.

Fig. 9 is a detailed view in partial cross section of a portion of the control valve.

Referring to Fig. 4, a propeller hub 10 is shown as being positioned on a drive shaft 12 by means of a rear cone 14 and a front cone 16 and held against rotation relative to the shaft by axial splines 17. The hub is fixed to the shaft 12 by means of a retaining nut 18 which includes a protruding rim 20 which cooperates with a recess 22 in the cone 16 to provide easy withdrawal of the cone 16 upon dismounting the propeller assembly from the shaft 12.

As shown in Fig. 1, the hub 10 includes a plurality of radially extending sockets 26 into each of which is mounted a propeller blade 28. Each of the blades 28 are rotatably fixed within the sockets 26 by means of a plurality of ball bearings 30 which may be preloaded in any of the well-known methods as, for example, by a jack screw mechanism and the like.

A vane motor generally indicated at 34 is contained centrally of each of the blades 28 for hydraulically varying the pitch of the blades and includes an outer movable portion 38 which is fixed to the blades 28 and an inner portion 40 which is fixed relative to the hub 10. Fluid under pressure is supplied via the lines 42 and 44 to either of the chambers 46 or 48 within the vane motor 34 to vary the blade pitch. Though shown schematically here, the vane motor may be of the type disclosed in Patent No. 2,339,042, issued January 11, 1944, to J. E. Anderson.

The supply of hydraulic fluid under pressure for operating the vane motor 34 is obtained from a pump assembly generally indicated at 50 which is housed within an annular casing 52 which in turn is fixed to the inboard portion of the hub 10 by means of four hollow through bolts 56, 58, 60 and 62 (Fig. 3). The pump 50 includes a plurality of two stage pistons 66 which are peripherally spaced about the hub axis and include a depending bifurcated portion 68 to which is attached a cam follower roller 70 (also see Fig. 2). Reciprocating movement is imparted to the piston 66 by means of an eccentric cam 72 carried by a sleeve 74 coaxially disposed about the drive shaft 12, which sleeve has its aft end fixed relative to the adjacent power plant or to other fixed nonrotatable structure by means of a gear connection 76 and has its forward end supported on the hub 10 by means of spaced roller bearings 78, 80. Thus during propeller rotation the entire pump casing 52 including pump 50 therein will revolve about the fixed sleeve 74 so that reciprocable motion is imparted to each of the pump pistons 66 as each of the rollers travel over the eccentric cam 72. A ring 82, better seen in Fig. 2, keeps the rollers 70 in contact with the cam 72 in opposition to centrifugal force and the suction pull of the pistons. For assembly purposes the ring 82 may be made in joined sections. Each of the pistons 66 comprises a comparatively larger diameter portion 84 and a comparatively small diameter portion 86 to provide two pressure stages. The large diameter portion 84 takes in oil which, through lubrication, leakage and drainage, accumulates in the open trough 90 and forces it through check valve 92 to the sump 94 from whence it can pass through passage 96 and subsequently be compressed by the high pressure portion 86 of the piston 66.

Centrifugal force will maintain the oil near the outer periphery of the trough 90 to keep each of the pistons properly supplied during propeller rotation. High pressure oil from the second pump stage is forced through a check valve 98 into a high pressure ring manifold 100 (shown also in Figs. 4 and 5) wherein the fluid pressure is maintained at some predetermined value, for instance three thousand pounds per square inch, by means of a high pressure relief valve which is housed within the through bolt 62 (Fig. 3) and is schematically indicated at 104 in Fig. 1. The pump mechanism just described and the principle of operation thereof is more fully described in Patent No. 2,462,931, issued March 1, 1949, to J. E. Anderson.

The oil which is by-passed by the high pressure relief valve 104 during its relieving operation is dumped into the annular sump 94. It will be noted that the first pressure stage provided by the large diameter portion 84 of the piston 66 of the pump 50 maintains adequate pressure in the sump 94 and this pressure is interconnected to the hub interior by means of a passage 110 shown schematically in Fig. 1 and more clearly illustrated in Figs. 3 and 4. The oil in the hub interior, which also lubricates the hub mechanism, is maintained at proper pressure by means of a safety valve 112 also shown schematically in Fig. 1 and generally indicated in Fig. 4. Referring to Fig. 4, valve 112 is housed within the through bolt 58 and includes a plurality of ports 116 which communicate with the sump 94 to permit fluid from the latter to pass into the chamber 118 and thence communicate with the hub interior mechanism via the passage 110. The valve 112 includes another port 120 which communicates with the sump 94 by means of a passage 122 to permit the pressure in the sump 94 to be relieved by a spring loaded valve 124. The relieved fluid passes via a port 126 into the trough 90.

The high pressure fluid from the high pressure manifold 100 is conducted to the propeller and operating control mechanism by means of a T fitting 130 (Fig. 4) which includes a plurality of ports 132 and a central passage 134 leading to a strainer assembly 136, the latter being housed within the hollow through bolt 60. The high pressure fluid leaving the strainer 136 is directed via a passage 140 to a distributor valve generally indicated at 150 which in turn directs fluid to either of the passages 42 and 44 to vary the pitch of the propeller blades in response to the controlling movements of the valve. Distributor valve 150 is controllably moved by means of a rod 154 which is operatively connected to gears 156 and a rack 158 which in turn is reciprocated by a translating mechanism 160 (Fig. 1). Mechanism 160 may be operated manually from the cockpit by means of a control rod 162 which includes a rack 164 (seen in Figs. 1 and 4) meshing with a gear segment 166. The gear segment 166 is an integral part of a ring 168 which is rotatably supported by means of ball bearings 170 carried by fixed structure 172 carried by the power plant. The bearings 170 hold the ring 168 against axial movement so that any rotational movement of the latter will impart axial movement to an inner coaxial flanged ring 174 by means of the camming action of the pin 176 in the cam slot 178 carried by the ring 174. A second pin 180 depends from the fixed structure 172 and cooperates with a slot 182 in the ring 174 thereby permitting only axial movement of the latter. The ring 174 has its flange 184 in abutting relationship with the rack 158 thereby providing reciprocable controlling movements for the control valve 150.

In its preferred form, the control rod 162 of Fig. 1 may assume the configuration as shown in Fig. 4 and may be moved transversely to the axis of the propeller by means of a gear 190 whose movements can be in turn controlled by means of a governor control system, for example, such as described and claimed in patent application Serial No. 464,620, filed November 5, 1942, now U. S. Patent No. 2,635,700 of April 21, 1953, and patent application Serial No. 77,644, filed February 21, 1949, now U. S. Patent No. 2,635,699 of April 21, 1953. The remaining translating mechanism illustrated in Fig. 4 is substantially identical to that described in connection with Fig. 1 and for convenience identical identifying numerals have been used in both these figures.

Referring to the valve 150 as viewed in Fig. 4, the reciprocable rod 154 is fixed to the central valve stem 200 which is surrounded by a follow-up sleeve 202. The follow-up sleeve in turn is surrounded by a fixed valve casing 204 which carries at its outboard end a rotatable collar 206 having a spiral slot 208 more clearly visible in Fig. 5. The fixed outer casing 204 of the valve 150 contains a through longitudinal slot 210 and has a pin 212 passing therethrough, which pin is fixed to the follow-up sleeve 202 and cooperates with the spiral slot 208 in the collar 206. Therefore, rotation of the collar 206 about the longitudinal axis of the valve 150 imparts longitudinal movement to the follow-up sleeve to reposition the valve in the proper position upon pitch changing movements of the propeller blades. To this end collar 206 has external teeth 216 which mesh with a gear 218 journalled on a bushing 220 housed within the hub 10. The gear 218 in turn meshes at 222 with a ring gear carried by the blade interconnecting gear 226. The interconnecting gear 226 is more clearly illustrated in Fig. 1 and as seen in this figure meshes with a gear segment 230 carried by the shank end of each of the propeller blades 28.

It is then apparent that when the valve stem 200 is moved, fluid under pressure is directed via the line 42 or 44 to vary the pitch of the propeller blades and the subsequent propeller pitch changing movements will rotate the interconnecting gear 226 which in turn rotates the follow-up gear 218 (Fig. 4). Rotation of the gear 218 rotates the collar 206 so that the spiral slot 208 therein cams against the pin 212 which action will impart longitudinal movement to the follow-up sleeve 202 to reposition the valve mechanism to neutral. It should be noted that the longitudinal slot 210 in the valve casing 204 prevents rotation of the sleeve 204 and insures only longitudinal movement thereof. The follow-up mechanism shown is of the type disclosed in Patent No. 2,462,932, issued March 1, 1949, to J. E. Anderson.

Referring to Figs. 1 and 5, a blade pitch lock mechanism 240 is provided to lock the propeller blades against pitch changing movements primarily in one direction only in the event that the propeller blades do not change pitch in proper response to the controlling movements of the valve 150. To this end an annular axially movable piston 244 is coaxially disposed around the forward end of the retaining nut 18 and is fixed against relative rotation to the hub 10 by means of splines 246. The inboard end of the piston 244 carries a ring of teeth 250 which cooperatively engage similar teeth on the outboard face of a ring 252 fixed to the blade interconnecting gear 226 in order to lock the propeller blades against pitch changing movements. The ring 252 which engages the teeth 250 on the piston 244 and its adjoining ring 254 which is also splined to the blade interconnecting gear 226 include internally depending lugs (not shown) which abut one or more flanges 256 carried by a locking member 258 which in turn is fixed relative to the propeller hub. The depending lugs mentioned above are properly spaced along the internal periphery of the rings 252 and 254 so that they may engage the flange or flanges 256 to positively limit the range of pitch changing movements of the propeller blades.

As seen in Figs. 6 through 8, the cooperating teeth on the piston 244 and the ring 252 are of such a shape that during engagement of the teeth or upon initial engagement thereof, movement of the blades and their accompanying ring 252 in one direction will tend to positively engage the cooperating teeth while movement of the blades in the opposite direction will urge the teeth out of engagement. The cooperating teeth shown constitute a ratchet mechanism. In their preferred form the cooperating teeth are arranged to positively lock the blades against movement toward low pitch while permitting blade movement toward high pitch.

The piston 244 as viewed in Fig. 5 is urged in an aft direction toward an engaging position with the teeth on the ring 252 by means of a plurality of circumferentially spaced coil springs 270 whose inboard ends protrude into the drilled passages 272 (better shown in Fig. 8) in the piston 244 and whose outboard ends are housed by similar drill passages in a retaining cap 274 held in position by a cover plate 276.

The cover plate 276 includes an annular chamber 280 which communicates with the outboard end of the piston 244 and also communicates via a passage 278 with the trough 90 whose internal pressure is normally atmospheric. In this manner the outboard end of the piston 244 is continuously vented to eliminate any excessive pressure build-ups that might occur through leakage to unbalance the operation of the entire pitch lock mechanism.

During normal operation of the propeller the piston 244 is maintained in an outboard or disengaged position by means of lubricating pressure which acts against the stepped faces 290 and 292 thereof (Fig. 5). Propeller lubricating oil is conducted to the piston by means of a passage 300 which in turn communicates with a passage 302 which runs transversely of and adjacent to the valve 150. In order to trace the flow lubricating oil pressure, it is best to refer to Fig. 4. As previously described, lubricating oil pressure exists adjacent the internal hub gear mechanism and the sump 94 since fluid communication is provided through the valve 112 and the passage 110. The same oil under pressure surrounds the blade interconnecting gear 226 and the follow-up gear 218 while also being present in the chamber 306 at the forwardmost end of the control valve 150 and within the hollow central passage of the valve stem 200. It should be understood that the primary supply of lubricating oil pressure is supplied via the control valve 150 which by-passes high pressure fluid entering the valve during normal operation and also directs return oil from the vane motors to the hub interior during pitch change.

Referring then to Fig. 9 which illustrates in detail the inboard end of the control valve 150, the lubricating pressure within the hollow stem 200 flows out through the port 310 in the valve stem 200, thence through a port 312 in the follow-up sleeve 202 and into the valve chamber 314 which communicates with the passage 302 referred to in Fig. 5. Thus it is apparent that during normal operation lubricating oil pressure will be maintained against the piston 244 so that the latter is forced in opposition to the springs 270 and atmospheric pressure toward a disengaged position to permit free pitch changing movements of the propeller blades.

In the event then that the control rod 154 and the valve stem 200 (Fig. 9) are moved to the right toward a pitch increasing direction and the blades fail to respond to such controlling movement, the blade follow-up mechanism including the follow-up sleeve 202 will remain stationary. After a predetermined movement of the valve stem 200 has been completed, the land 320 carried by the stem 200 will close the port 312 in the follow-up sleeve 202 and open a port 322 carried by the follow-up sleeve. Upon the opening of port 322 then, the lubricating oil pressure which is normally maintained in the chamber 314 and the passage 302 will be bled out through port 322 into the aft chamber 326 in the valve housing which chamber opens into the trough 90 by means of a passage 328. The relationship of the passage 328 with the remainder of the propeller mechanism is more clearly seen in Fig. 4. As best seen in Fig. 5, when the pressure in the lines 302 and 300 are vented to the trough 90, the pressure on the piston faces 290 and 292 and the pressure in the chamber 280 on the outboard side of the piston are equal inasmuch as under these conditions the working fluid on both sides of the piston is vented to atmosphere (trough 90). Following this draining operation, the springs 270 will urge the piston inboard so that the teeth 250 carried thereby will engage the teeth on the ring 252 to lock the blades and their interconnecting gear to the hub. The shape of the cooperating locking teeth being as shown, the blades will be prevented from movement toward a lower pitch while movement toward a higher pitch is still possible in the event that intermittent proper operating conditions are restored.

Thus if, for example, the operating oil pressure were fluctuating or if the pressure built up sufficiently to overcome leakage, the blades could move toward a higher pitch setting while still being held against any subsequent movement toward low pitch.

It is therefore apparent that as a result of this invention a rugged simple and automatic blade pitch lock mechanism has been provided which will prevent blade pitch movements in one direction upon failure of the blades to change pitch in response to predetermined movements of the pitch control mechanism.

Although certain embodiments of this invention have been illustrated and described herein, it is to be understood that various modifications and changes may be made in the shape and arrangement of the component parts without departing from the scope of this novel concept.

What it is desired by Letters Patent is:

1. In a propeller having a hub, a plurality of blades carried by said hub and mounted for pitch changing movements relative thereto, means for changing the pitch of said blades, means providing two sources of pressure of different values, valve means for controlling said pitch changing means including mechanism providing communication between one of said sources and said pitch changing means, a sump, means for locking said blades against pitch change including a movable member, means effecting one side of said member for urging said member into a lock engaging position including resilient means and pressure from said sump, and means forming a portion of said valve means and operatively connected to the other of said two sources for directing fluid to the other side of said member and urging said member into lock disengage position including means responsive to a predetermined relative position between the pitch of the blades and said valve means for locking said blades, said last mentioned means including mechanism for connecting said other side of said member to said sump.

2. In a propeller including a hub having variable pitch blades carried thereby and mounted for pitch changing movements relative thereto, means for changing the pitch of said blades comprising an hydraulic motor, a source of fluid under pressure, valve means including two valve portions having operative connections to said source of pressure, one of said valve portions providing fluid communication to said motor, means for locking the propeller blades against pitch changing movements comprising a lock, a hydraulic piston operatively connected with the other of said valve portions, said piston receiving said fluid pressure and being urged into a lock disengaged position, and means for urging said lock into locking position including a resilient member, said lock comprising a ratchet member connected with said blade and cooperating ratchet member fixed for rotation with said hub, said cooperating ratchet member being connected to and movable with said piston to lock the blades against movement in one direction during engagement of said lock, and means responsive to a predetermined movement of said valve relative to said blades for disengaging said lock comprising fluid ports carried by said other valve portion and mechanism movable with said blades, said movable mechanism including fluid passages cooperating with said ports to vent the fluid pressure being received by said piston.

3. In an hydraulically operated propeller having a hub, a plurality of blades carried by said hub and mounted for pitch changing movements relative thereto, means for varying the pitch of the blades comprising an hydraulic motor operatively connected to the blades, a source of fluid under relatively high pressure, and means including a valve connecting said source and said motor for controlling the pitch of the blades, a source of pressure less than said high pressure fluid, means for locking the blades against pitch changes comprising a lock, an annular hydraulic piston fixed against rotation relative to said hub, and resilient means urging said piston into a lock engaged position, means for directing said fluid of lesser pressure to said piston to normally urge the latter into a lock disengaged position, and means operable in response to the controlling movements of said valve for venting said fluid directing means to atmosphere to engage said lock including follow-up mechanism operatively connected to said blades comprising a passage which is opened during a predetermined positioning of said blades relative to said valve.

4. A lock for the pitch changing mechanism of an hydraulically controllable pitch propeller comprising a hub, blades supported in said hub for pitch changing movement, a hydraulically actuated pitch changing motor, and a source of hydraulic pressure, a valve having a follow-up connection with said blades for controlling the application of said pressure to said motor and for venting motor to the hub interior, means maintaining fluid pressure in said hub less than said hydraulic pressure, a pitch lock mechanism for said blades, means for actuating said valve to control said blade pitch, said valve including a valve portion normally directing said hub fluid pressure to said pitch lock mechanism and responsive to a predetermined movement between said valve and said follow-up connection to disconnect said lock from said pressure source, and means urging said lock into locked position.

5. A lock according to claim 4 wherein the pitch lock mechanism includes ratchet means for locking said blades against pitch changing movements in one direction only.

6. In a propeller having a hub, a plurality of blades carried by said hub and mounted for pitch changing movements relative thereto, means for changing the pitch of said blades, a source of power for actuating said pitch changing means, means for controlling said pitch changing means including a valve operatively connected to said source of power and mechanism cooperating with said valve and positioned in accordance with the pitch position of said blades, means for moving said valve relative to said cooperating mechanism within a normal range of pitch changing movements to provide for increase of the pitch of said blades, means for locking said blades against pitch changing movements, means connected to said source of power for holding said locking means in an unlocked position during movement of said valve in said normal range, and means operatively connected to said holding means and responsive to relative movement of said valve and cooperating mechanism beyond said normal range in a pitch increase direction for disabling said holding means.

ERLE MARTIN.
THOMAS B. RHINES.

References Cited in the file of this patent

UNITED STATES PATENTS

| Number | Name | Date |
|---|---|---|
| 1,661,632 | Nixon | Mar. 6, 1928 |
| 1,962,459 | Ostlund | June 12, 1934 |
| 2,156,102 | Austin | Apr. 25, 1939 |
| 2,276,347 | Ruths et al. | Mar. 17, 1942 |
| 2,320,195 | Rindfleisch | May 25, 1943 |
| 2,343,416 | Keller | Mar. 7, 1944 |
| 2,370,135 | Berliner | Feb. 27, 1945 |
| 2,370,167 | Hoover et al. | Feb. 27, 1945 |
| 2,462,932 | Anderson | Mar. 1, 1949 |

FOREIGN PATENTS

| Number | Country | Date |
|---|---|---|
| 496,022 | Great Britain | Nov. 23, 1938 |
| 497,999 | Great Britain | Jan. 2, 1939 |
| 562,845 | Great Britain | July 19, 1944 |